(12) United States Patent
Fujimoto

(10) Patent No.: US 12,411,605 B2
(45) Date of Patent: Sep. 9, 2025

(54) MEMORY CARD AND HOST DEVICE

(71) Applicant: Kioxia Corporation, Tokyo (JP)

(72) Inventor: Akihisa Fujimoto, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/601,025

(22) Filed: Mar. 11, 2024

(65) Prior Publication Data

US 2024/0311010 A1 Sep. 19, 2024

(30) Foreign Application Priority Data

Mar. 13, 2023 (JP) ................................. 2023-038700

(51) Int. Cl.
*G06F 12/00* (2006.01)
*G06F 3/06* (2006.01)

(52) U.S. Cl.
CPC ............ *G06F 3/061* (2013.01); *G06F 3/0619* (2013.01); *G06F 3/0634* (2013.01); *G06F 3/0679* (2013.01)

(58) Field of Classification Search
None
See application file for complete search history.

(56) References Cited

U.S. PATENT DOCUMENTS

| | | |
|---|---|---|
| 11,041,763 B2 | 6/2021 | Bahirat et al. |
| 11,500,447 B2 | 11/2022 | Hodes et al. |
| 2007/0067598 A1 | 3/2007 | Fujimoto |
| 2011/0238933 A1 | 9/2011 | Fujimoto et al. |
| 2015/0234598 A1 | 8/2015 | Fujimoto |
| 2016/0170642 A1* | 6/2016 | Miyamoto ............ G06F 3/0655 711/103 |
| 2021/0081120 A1 | 3/2021 | Iwai et al. |
| 2022/0413709 A1* | 12/2022 | Kato ..................... G06F 3/0679 |
| 2024/0361822 A1* | 10/2024 | Takada .................. G06F 3/0634 |

* cited by examiner

*Primary Examiner* — Daniel D Tsui
(74) *Attorney, Agent, or Firm* — Maier & Maier, PLLC

(57) ABSTRACT

According to one embodiment, a memory card includes a nonvolatile memory and a controller. The controller performs initialization of an interface, determines a maximum performance that can be supported from among a plurality of performance predetermined for stream recording, based on a bus configuration of the interface determined at the interface initialization and a maximum allowable power consumption set during the interface initialization, and generates a data set stored in a power state register specified by an NVMe™ standard, which is a power state set in which each of all performance smaller than the determined maximum performance among the plurality of performance corresponds to a power state, to indicate a list of the performance which can be supported for a host.

19 Claims, 7 Drawing Sheets

| Host | PCIe/NVMe memory device | | | |
|---|---|---|---|---|
| | Gen3 1-lane | Gen3 2-lane | Gen4 1-lane | Gen4 2-lane |
| Gen3 1-lane | Gen3 1-lane | Gen3 2-lane | Gen4 1-lane | Gen3 1-lane |
| Gen3 2-lane | Gen3 1-lane | Gen3 2-lane | Gen3 1-lane | Gen3 2-lane |
| Gen4 1-lane | Gen3 1-lane | Gen3 1-lane | Gen4 1-lane | Gen4 1-lane |
| Gen4 2-lane | Gen3 1-lane | Gen3 2-lane | Gen4 1-lane | Gen4 2-lane |

F I G. 2

| Class | Gen3x1 1GB/s | Gen3x2/Gen4x1 2GB/s | Gen4x2 4GB/s |
|---|---|---|---|
| 1 | 150MB/s | 750MB/s | 1500MB/s |
| 2 | 300MB/s | 900MB/s | 1800MB/s |
| 3 | 450MB/s | 1050MB/s | 2100MB/s |
| 4 | 600MB/s | 1200MB/s | 2400MB/s |

| SPL | Gen3x1 |
|---|---|
| 4.0W | 600MB/s |
| 3.2W | 600MB/s |
| 2.8W | 600MB/s |
| 2.5W | 600MB/s |
| 1.8W | 450MB/s |

(b)

| SPL | Gen3x1 |
|---|---|
| 4.0W | 300MB/s |
| 3.2W | 300MB/s |
| 2.8W | 300MB/s |
| 2.5W | 300MB/s |
| 1.8W | 300MB/s |

PCIe Gen3 1-lane Device (c)

| SPL | Gen3x1 | Gen4x1 |
|---|---|---|
| 4.0W | 600MB/s | 1050MB/s |
| 3.2W | 600MB/s | 1050MB/s |
| 2.8W | 600MB/s | 900MB/s |
| 2.5W | 600MB/s | 900MB/s |
| 1.8W | 450MB/s | 750MB/s |

PCIe Gen4 1-lane Device (d)

| SPL | Gen3x1 | Gen3x2 |
|---|---|---|
| 4.0W | 450MB/s | 900MB/s |
| 3.2W | 450MB/s | 900MB/s |
| 2.8W | 450MB/s | 900MB/s |
| 2.5W | 450MB/s | 900MB/s |
| 1.8W | 450MB/s | N/A |

PCIe Gen3 2-lane Device (e)

| SPL | Gen3x1 | Gen3x2/Gen4x1 | Gen4x2 |
|---|---|---|---|
| 4.0W | 450MB/s | 900MB/s | 1800MB/s |
| 3.2W | 450MB/s | 900MB/s | 1500MB/s |
| 2.8W | 450MB/s | 900MB/s | N/A |
| 2.5W | 450MB/s | 900MB/s | N/A |
| 1.8W | 450MB/s | N/A | N/A |

PCIe Gen4 2-lane Device

FIG. 4

| Power state | 150MB/s support device | 300MB/s support device | 450MB/s support device | 600MB/s support device |
|---|---|---|---|---|
| PS0 | 150MB/s | 300MB/s | 450MB/s | 600MB/s |
| PS1 | N/A | 150MB/s | 300MB/s | 450MB/s |
| PS2 | N/A | N/A | 150MB/s | 300MB/s |
| PS3 | N/A | N/A | N/A | 150MB/s |

F I G. 5

| Power state | 900MB/s support device |
|---|---|
| PS0 | 900MB/s |
| PS1 | 750MB/s |
| PS2 | 600MB/s |
| PS3 | 450MB/s |
| PS4 | 300MB/s |
| PS5 | 150MB/s |

F I G. 6

|  | Version 1 device | Version 2 device | Version 3 device |
|---|---|---|---|
| Version 1 host | Maximum 「600MB/s」 | Maximum 「600MB/s」 | Maximum 「600MB/s」 |
| Version 2 host | Maximum 「600MB/s」 | Maximum 「1200MB/s」 | Maximum 「1200MB/s」 |
| Version 3 host | Maximum 「600MB/s」 | Maximum 「1200MB/s」 | Maximum 「2400MB/s」 |

F I G. 7

MEMORY CARD AND HOST DEVICE

CROSS-REFERENCE TO RELATED APPLICATIONS

This application is based upon and claims the benefit of priority from Japanese Patent Application No. 2023-038700, filed Mar. 13, 2023, the entire contents of which are incorporated herein by reference.

FIELD

Embodiments described herein relate generally to a memory card and a host device.

BACKGROUND

In recent years, various memory cards have become prevalent. An SD™ card is known as one of the memory cards. SD Express™ cards, which conform to the SD Express™ card specification defined by the SD™ standard, is connected to a host via the Interface (link) conforming to the PCI Express™ (PCIe™) standard to execute communication with the host for writing or reading data using protocols conforming to the NVMe™ (NVMe™) standard.

Recently, a demand for SD Express™ cards to be able to stably perform stream recording, such as recording, for a long period of time has been increased.

BRIEF DESCRIPTION OF THE DRAWINGS

FIG. 2 is a view showing a principle of determining a configuration of an interface conforming to PCIe™ standard in the SD Express™ specification defined under SD™ standard.

FIG. 3 is a table showing an example of allocating performance to each interface configuration that can be assumed under the SD Express™ specification defined under the SD™ standard.

FIG. 4 is a table showing an example of an implementation of a memory device based on the calculation results of the maximum performance (class) for a combination of interface configuration and maximum allowable power.

FIG. 5 is a table showing an example of a configuration of power state set [2] in the memory device of the embodiment.

FIG. 6 is a table showing an example of a configuration of power state set [2] conforming to an extended standard on stream recording.

FIG. 7 is a table showing an example of determining the maximum performance by a combination of a host version and a device version in a case where the standard is extended.

DETAILED DESCRIPTION

In general, according to one embodiment, a memory card includes a nonvolatile memory and a controller. The controller is connectable to a host via an interface conforming to PCI Express™ (PCIe™) standard, and capable of performing communication for writing or reading data via a protocol conforming to the NVM Express™ (NVMe™) standard, with the host, and controls the nonvolatile memory. The controller performs initialization of the interface cooperatively with the host, determines a maximum performance that can be supported from among a plurality of performance predetermined for stream recording, based on a bus configuration of the interface determined at the interface initialization and a maximum allowable power consumption set during the interface initialization, and generates a data set stored in a power state register specified by the NVMe™ standard, which is a power state set in which each of all performance smaller than the determined maximum performance among the plurality of performance corresponds to a power state, to indicate a list of the performance which can be supported for a host.

Embodiments will be described hereinafter with reference to the accompanying drawings.

Figure 1:
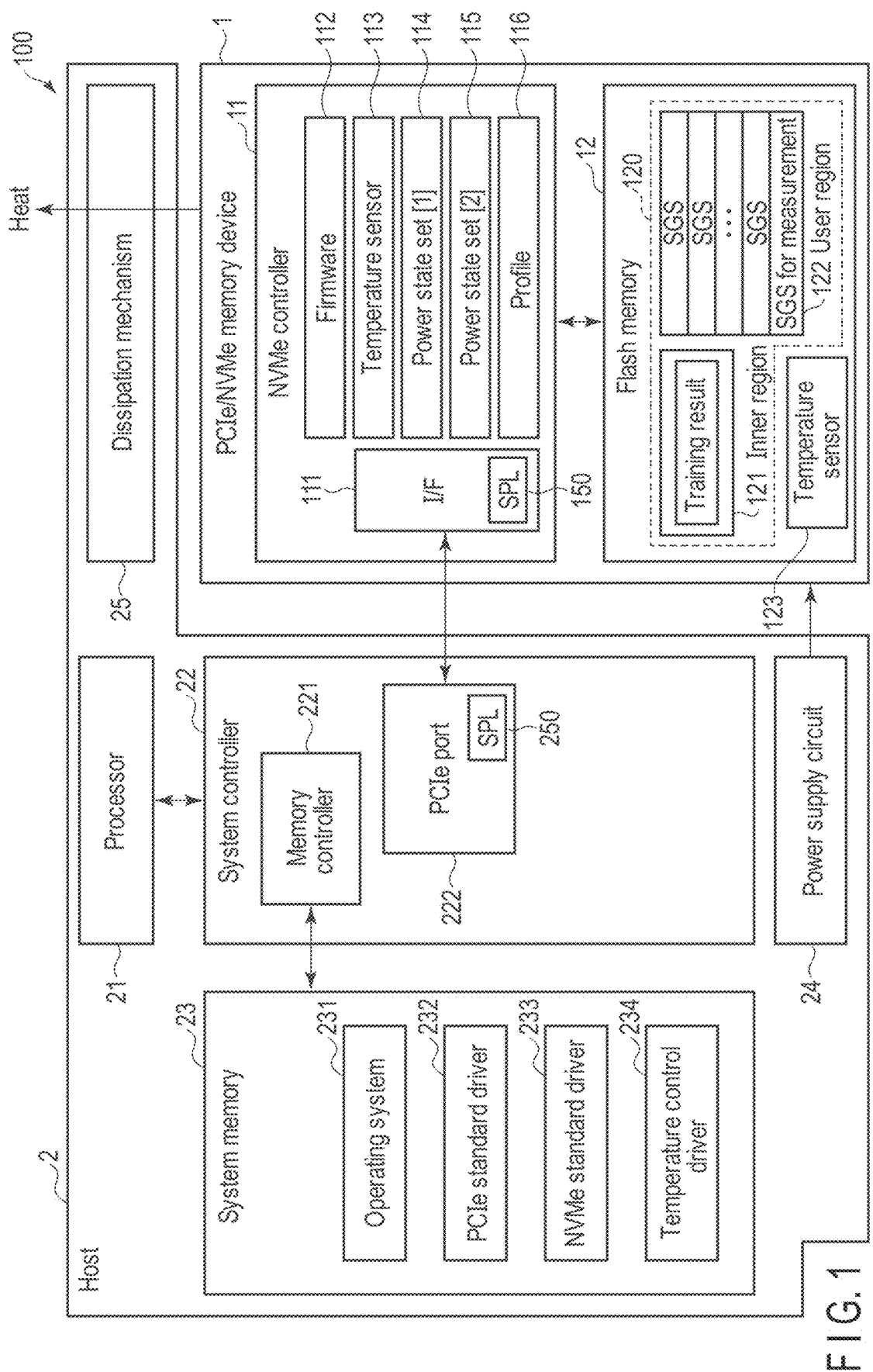
FIG. 1 is a view showing an example of a configuration of a memory system of an embodiment.

FIG. 1 is a view showing an example of a configuration example of a PCIe™/NVMe™ memory device 1 (hereinafter referred to as a memory device 1) of the embodiment. FIG. 1 also shows an example of a configuration of a host 2 to which the memory device 1 is applied as a storage, and an example of a configuration of an information processing system 100 including the memory device 1 and the host 2 (i.e., an example of connection between the memory device 1 and the host 2).

The memory device 1 is realized as, for example, an SD Express™ card. The SD Express™ card has, for example, a shape of a standard size SD™ card or a microSD™ card. The SD Express™ card includes terminals of a plurality of rows, can execute communication conforming to the SD™ standard with the host 2 using the terminal of the first row among the plurality of rows, and can execute communication conforming to the PCI Express™ standard with the host 2 using the terminals of the plurality of rows. The memory device 1 includes an NVMe™ controller 11, and a flash memory 12.

The NVMe™ controller 11 controls a system memory 23 and the flash memory 12 via PCIe buses. For example, the NVMe™ controller 11 controls a process of reading data in a specified location on the system memory 23 and writing the data to the flash memory 12 in response to a write command from the host 2, and controls a process of reading the data from the flash memory 12 and transfers the data to a specified location on the system memory 23 in response to a read command from the host 2. The NVMe™ controller 11 is realized as, for example, a large scale integration (LSI).

The NVMe™ controller 11 includes an interface circuit 111, firmware 112, a temperature sensor 113, a power state set [1] 114, a power state set [2] 115, and a profile 116.

The interface circuit 111 establishes (connects) an interface (link) conforming to the PCIe™ standard with a PCIe™ port 222 of the host 2. The NVMe™ controller 11 receives an NVMe™ command conforming to the NVMe™ standard and transmits a result of execution of the process corresponding to the NVMe™ command, via an interface conforming to the PCIe™ standard. In other words, the above-described write command and write command are NVMe™ commands. The NVMe™ controller 11 can transmit an interrupt signal to a processor 21 of the host 2 via the PCIe interface, by packets in a format specified in the protocol conforming to the PCIe™ standard. In addition, the NVMe™ controller 11 can access the system memory 23 of the host 2 via the system controller 22 of the host 2, via the interface. More specifically, the NVMe™ controller 11 can write data directly to the system memory 23 or read data from the system memory 23 by serving as a direct memory access (DMA) master of PCIe.

The interface circuit 111 includes a Slot Power Limit (SPL) register 150. An SPL value of the host 2 is stored in the SPL register 150. The SPL value is indicative of the maximum allowable power that the host 2 sets for the memory device 1. The SPL value of the host 2 is transmitted from the host 2 to the memory device 1, for example, during the initialization of the interface, which the system controller 22 of the host 2 and the NVMe™ controller 11 of the memory device 1 execute cooperatively. When setting the maximum allowable power for the memory device 1, the host 2 stores the SPL value indicative of the maximum allowable power, in an SPL register 250 of the PCIe™ port 222. In other words, the SPL value stored in the SPL register 250 of the PCIe™ port 222 is transmitted from the host 2 to the memory device 1 and stored in the SPL register 150 of the interface circuit 111.

Firmware 112 is a program that describes an operation procedure of the NVMe™ controller 11 to control the flash memory 12. For example, when the NVMe™ controller 11 is realized as an LSI, the control of the flash memory 12 by the NVMe™ controller 11 is realized by the firmware 112, by using a partial region on a random access memory (RAM) in the LSI and by loading the firmware 112 on the RAM and executing the firmware 112 by a central processing unit (CPU).

The temperature sensor 113 detects a temperature of the NVMe™ controller 11. A temperature sensor 123 is built in the flash memory 12, and the NVMe™ controller 11 can also read the temperature of the flash memory. The host 2 can obtain the temperature of the NVMe™ controller 11 detected by the temperature sensor 113 or the temperature of the flash memory 12 from the memory device 1, with the NVMe™ command. Although not shown in the drawing, these temperatures can also be read using sideband signals (SMBUS) that connect the host with the device.

The power state set [1] 114 and the power state set [2] 115 are one or more power state sets that are stored in power state registers defined under the NVMe™ standard. The power state register in the NVMe™ controller is configured with the power state set [1] 114 and the power state set [2] 115 in mixture. Ordering of power states is rearranged to descending power consumption order. The power state register of the memory device 1 can store up to thirty-two power states. The power states include the power consumption of the memory device 1 when operating with its power state and can be defined from PS0 to PS31. One or more power states are set such that the power consumption is lower as the number of a subscript of PS is larger. In addition, the performance of the memory device 1 also becomes smaller as the power consumption becomes lower.

For example, when the memory device 1 supports the performance of four data transfer rates "600 MB/s", "450 MB/s", "300 MB/s", and "150 MB/s" between the host 2 and the memory device 1, four power states PS0=600 MB/s, PS1=450 MB/s, PS2=300 MB/s, and PS3=150 MB/s are generally defined. In the memory device 1, power state PS0 is selected in an initial state.

By associating the performance with the power state, the host 2 can read the power state register of the memory device 1 with the NVMe™ command and can recognize the performance supported by the memory device 1 by the contents of this power state register. In addition, the host 2 can know the power consumption of each power state from the power state register, and can specify any one of one or more power states set in the memory device 1 and request the memory device 1 to select the specified power state by the NVMe™ command. For example, the host 2 can control the temperature of the memory device 1 by urging the memory device 1 to select a power state with lower performance than the power state set at that time to reduce the power consumption (heat generation) of the memory device 1.

One of features of the memory device 1 of the embodiment is to have two power state sets, i.e., the power state set [1] 114 and the power state set [2] 115. More specifically, the memory device 1 of the embodiment has the power state set [2] 115 for stream recording in addition to the power state set [1] 114 for default, which is a conventional power state set. The reason for having the power state set [2] 115 for stream recording will be described below. Incidentally, when the memory device 1 is intended to be used only for stream recording, the memory device 1 may be configured to have only the power state set [2] 115 for stream recording in place of the power state set [1] 114 for default.

The profile 116 is a register storing the support information on stream recording that the memory device 1 can support. The support information includes a stream granularity size (SGS), which is the management region size of the stream data, stream write size (SWS), which is the stream write command data size, the number of streams that can be recorded simultaneously, and the like. In addition, the result of calculating the maximum performance that can be implemented in memory device 1 for the combination of the interface configuration and the maximum allowable power is stored, which is the information for generating the power state for stream recording. This information is related to FIG. 4 and will be explained later.

The flash memory 12 includes an internal region 121, a user region 122, and a temperature sensor 123.

Each of the internal region 121 which the host 2 cannot access, and the user region 122 which the host 2 can access, is secured as an independent region by logically dividing the storage region 120 of the flash memory 12 by the NVMe™ controller 11. The internal region 121 is a region for storing the information used for internal processing of the memory device 1. A "training result" in the drawing will be described below. In contrast, the user region 122 is a region which the host can freely use, for example, a region where data requested to be written by the host 2 is stored. FIG. 1 shows an example in which the memory device 1 is used for stream recording, and the "stream granularity size (SGS)" in the drawing is the unit of the region where the stream data is stored. Each SGS is a physically divisible region of the flash memory 12. In addition, a logical address (Logical Block Address [LBA]) that is an integer multiple of the size of the SGS can be freely assigned to the start address of each SGS, and continuous logical addresses (LBA) are assigned in any SGS. The "SGS for measurement" will be described below.

Temperature sensor 123 detects the temperature of the flash memory 12. More specifically, the temperature sensor 123 detects a temperature of a memory chip constituting the storage region 120 of the flash memory 12. The NVMe™ controller 11 can read the temperature of the temperature sensor 123 by issuing a command to the flash memory 12. The host 2 can obtain the device temperature from the memory device 1 by using the NVMe™ command to read the temperature information. When receiving the NVMe™ command to read the temperature information, the NVMe™ controller 11 returns the value of the temperature sensor 123, which is read from the flash memory 12, to the host 2 as the device temperature.

The host 2 includes a processor 21, a system controller 22, a system memory 23, a power supply circuit 24, and a heat dissipation mechanism 25.

The processor 21 loads various programs stored in the flash memory 12 into the system memory 23 and executes the programs. Various programs include an operating system 231, a PCIe™ standard driver 232, an NVMe™ standard driver 233, and a temperature control driver 234.

The operating system 231 controls allocation of resources such as the processor 21 to various programs. For example, to make a hardware devise such as system controller usable, suitable drivers (PCIe and NVMe) are loaded to system memory by the operating system 231. In addition, the operating system 231 controls the user interface for various programs to exchange data with the user.

The PCIe™ standard driver 232 controls communication using a protocol conforming to the PCIe™ standard via an interface conforming to the PCIe™ standard. The NVMe™ standard driver 233 controls communication using a protocol conforming to the NVMe™ standard via an interface conforming to the PCIe™ standard. Since the PCIe™ standard driver 232 and the NVMe™ standard driver 233 are standard drivers, the drivers cannot be customized. Since the NVMe power state is implemented in accordance with each device, the NVMe™ Standard Driver 233 does not control the power state of the memory device 1, but the Autonomous Power State Transitions function, which allows devices to execute the power state transition, may be used or the temperature control driver 234 may be used to manage the temperature inherent to the system, and the like.

The NVMe™ standard driver 233 can obtain the support information from the memory device 1 by using the NVMe™ command. The support information includes information indicating whether or not the memory device 1 supports stream recording. In addition, stream recording can be requested by using NVMe™ command through the NVMe™ standard driver 233.

The temperature control driver 234 is a driver inherent to the information processing system 100 and can control the temperature of the memory device 1 by specifying the power state to be used. The temperature control driver 234 obtains the temperature of the NVMe™ controller 11 detected by the temperature sensor 113 and the temperature of the flash memory 12 detected by the temperature sensor 123 from the memory device 1 using the NVMe™ command. For example, when the temperature of flash memory 12 obtained from the memory device 1 exceeds a threshold value, the temperature control driver 234 executes temperature control of lowering the temperature of the memory device 1, by switching the above-described power state to the power state of low performance and lower power consumption, using the NVMe™ command, to prevent the flash memory 12 from being broken. In addition, for example, the temperature control driver 234 also executes temperature control of return to the original high-performance power state, using the NVMe™ command, when the temperature of the flash memory 12 obtained from the memory device 1 sufficiently drops after switching the power state. NVMe has a function to set two temperature thresholds, TMT1 and TMT2, as temperature threshold values (thermal management temperatures). In this case, the device executes the temperature comparison and can change the power state when the temperature of the flash memory 12 exceeds the threshold values. In addition, the host can also be notified of events in response to temperature changes.

Incidentally, if the memory device 1 is used for a purposes other than stream recording, the memory device 1 is operated in the power state which is set for the maximum performance until the temperature of the flash memory 12 exceeds the threshold value. When the temperature of the flash memory 12 exceeds the threshold value, the power state is temporarily switched to the power state of low performance to operate the memory device 1, which may cause no problems if the device can continue to be used.

In contrast, if the memory device 1 is used for stream recording, for example, it is undesirable that image quality is temporarily degraded during recording, and video data generated in real time cannot be recorded. Therefore, switching the power state of the memory device 1 with large performance changes during the stream recording is desirably avoided.

In addition, the PCIe™ and the NVMe™ are highly flexible, and the performance of the memory device 1 is also constrained since the performance of the PCIe bus changes depending on the combination with the host 2. Therefore, it is difficult for the host 2 to select a power state suitable for stream recording from among all the power states supported by the memory device 1.

Thus, the memory device 1 of the embodiment prepares the power state set [2] 115 for stream recording in addition to the conventional power state set, i.e., the power state set [1] 114 for default. The power state set [2] 115 is, for example, a set of one or more power states that enables a power state where the temperature of the flash memory 12 does not exceed a threshold value to be selected, by indicating a pair of the stable performance for stream recording and the power consumption required for the performance as a plurality of power states. The temperature of the device also changes depending on the system heat dissipation mechanism 25. A method of determining the contents of the power state set [2] 115 (one or more power states to be stored in the power state register) will be described below.

The system controller 22 controls the processor 21 accessing to the system memory 23 and also controls the processor 21 accessing to the memory device 1. The system controller 22 includes a memory controller 221, and a PCIe™ port 222. The memory controller 221 controls data transfer to and from the system memory 23. The PCIe™ port 222 establishes (connects) an interface (link) conforming to the PCIe™ standard with the interface circuit 111 of the memory device 1 to control the data transfer to and from the memory device 1. The PCIe™ port 222 includes the above-described SPL register 250.

In addition, the system controller 22 controls the memory device 1 accessing the system memory 23 by PCIe DMA master transfer. In other words, the system controller 22 issues NVMe™ commands to the NVMe™ controller 11 of the memory device 1, and the memory device 1 can write data to the system memory 23 and read data from the system memory 23, using the PCIe DMA master transfer, in response to the received NVMe™ commands.

The power supply circuit 24 generates electric power for operation of the memory device 1 and supplies the power to the memory device 1. The power supply circuit 24 needs to have an ability to supply electric power higher than or equal to the maximum allowable power as indicated by the SPL value stored in the SPL register 250 of the PCIe™ port 222. Conversely, a lower power value can be set in the SPL, depending on the power supply ability.

The heat dissipation mechanism 25 dissipates heat generated in the memory device 1 by the power consumption of the memory device 1 to the outside of the information processing system 100. The heat dissipation mechanism 25 is, for example, a heat dissipation sheet formed of a flexible material with a high thermal conductivity, such as acrylic resin.

The heat dissipation mechanism 25 theoretically has an ability to dissipate heat generated in the memory device 1 when the maximum allowable power indicated by the SPL value is supplied from the power supply circuit 24. However, since an air layer in a gap between the heat dissipation mechanism 25 arranged on the host 2 side and the memory device 1 has a low thermal conductivity, the temperature of the memory device 1 may be caused to rise.

Next, a method of determining the contents of the power state set [2] 115 (one or more power states to be stored in the power state register) by the NVMe™ controller 11, in the memory device 1 of the embodiment, will be described.

The specifications of the SD Express™ card defined under the SD™ standard include provisions on the number of lanes and provisions on the generation (data transfer rate) for the interface (link) conforming to the PCIe™ standard that connects the host 2 with the memory device 1. More specifically, one lane and two lanes are applicable, as regards the number of lanes, and Gen3 (1 GB/s) and Gen4 (2 GB/s) are applicable, as regards the generations. The interface conforming to the PCIe™ standard may be simply referred to as an interface, in the following descriptions.

Therefore, the interface configuration connecting the host 2 with the memory device 1 is determined by the combination of the host 2 and the memory device 1, as shown in FIG. 2.

As shown in FIG. 2, when one of the host 2 and the memory device 1 is "Gen3" and when the other is "Gen4", the interface configuration is determined to be "Gen3". In addition, when one of the host 2 and the memory device 1 is "1-lane" and when the other is "2-lane", the interface configuration is determined to be "1-lane".

For example, when the host 2 is "Gen3 1-lane" and the memory device 1 is "Gen4 2-lane", the interface configuration is determined to be "Gen3 1-lane". Conversely, when the host 2 is "Gen4 2-lane" and the memory device 1 is "Gen3 1-lane", the interface configuration is also determined to be "Gen3 1-lane". This interface configuration is determined in the interface initialization process performed cooperatively between the PCIe™ port 222 of the host 2 and the interface circuit 111 of the memory device 1. The information indicating the determined interface configuration (PCIe™ bus configuration information) is stored in a PCIe™ register (not shown) of the interface circuit 111, in the memory device 1.

The interface performance has a relationship of "Gen3 1-lane"<"Gen3 2-lane"/"Gen4 1-lane"<"Gen4 2-lane". In addition, in general, the required power consumption is larger as the interface performance is higher. The data transfer performance is not only determined by the interface configuration, but may also be limited by the maximum allowable power (SPL value) that is set for the memory device 1 by the host 2. This is because when the allowable power is insufficient, the memory device 1 reduces the data transfer performance such that the power consumption is adjusted to be below the maximum allowable power.

The power state set [1] 114 for default will be described here. More specifically, the power state set [1] 114 can define a power state in which the maximum data transfer rate supported by the memory device 1 can be obtained at the maximum number of lanes supported by the device and the fastest generation, as PS0, and define the power states whose total number is thirty two at maximum as the specifications of the memory device 1, while decreasing the supported data transfer rate and reducing the power consumption. When rapid cooling is required upon exceeding the temperature threshold value, it is necessary to shift to PS1 or PS2 and rapidly reduce performance, but the optimal rate of reducing the performance is determined by the threshold temperature, the implementation of the host heat dissipation mechanism 25, and the control method of the temperature control driver 234 and throttling which is explained below. In other words, the implementation needs to be adjusted for each system.

In contrast, options of the data transfer rate are predefined as, for example, the SD Express™ specifications of the SD™ standard, for stream recording. After the interface initialization is completed and the interface configuration is determined, the memory device 1 defines the maximum data transfer rate supported by the memory device 1 among the predefined options for the power state set [2] 115 for stream recording, as power state PS0, and then sequentially defines all the data transfer rates that is lower than the data transfer rate defined as the power state PS0 among the options as power state PS1, power state PS2, and the like.

FIG. 3 is a table showing an example of assigning a predetermined number of types of performance to each of the interface configurations that can be assumed in the SD Express™ specification of the SD™ standard, as standards related to stream recording.

For example, four types of performance are assigned to each of the interface configurations. The four types of performance are standardized as classes, and larger numbers represent higher performance. In manufacturing the products of the memory device 1, this standardization allows the manufacturer to select the performance which can be supported by the memory device 1 for stream recording, among the four types of performance, and to indicate the maximum performance that can be supported as the memory device performance.

For example, in the case of "Gen3 1-lane", the maximum performance for stream recording may be selected from "150 MB/s", "300 MB/s", "450 MB/s", and "600 MB/s". For example, when manufactured with "600 MB/s" considered as the maximum performance for stream recording, the memory device 1 can also support "450 MB/s", "300 MB/s", and "150 MB/s". For example, in order for the host to perform stable stream recording with the performance of "600 MB/s" for a long time, it is necessary to comprise the heat dissipation mechanism 25 that can dissipate the power consumption of the memory device listed in power state PS0, and it is necessary to prevent the temperature rise above a certain level from occurring for continuous memory access in "600 MB/s". Normally, the temperature is set not to exceed the upper temperature limit for safe use of flash memory.

When the SD Express™ specification of the SD™ standard supports the performance up to "600 MB/s", it makes little sense for the host to implement "Gen4 2-lane", and "Gen3 1-lane" is sufficient. "Gen4 1-lane" has the advantage of facilitating the implementation of "600 MB/s".

In order to prevent the temperature rise above a certain level from occurring during stream recording, the NVMe™ controller 11 performs throttling. The performance of the connection interface itself between the NVMe™ controller 11 and the flash memory 12 is determined by the bus width and the clock frequency. Throttling is, for example, a method of controlling the frequency of data transfer performed on this connection interface, which can be considered as a method of adjusting the utilization rate of the connection interface. In other words, when the maximum performance of the connection interface is 1,000 MB/s, the memory device 1 supporting the performance of "600 MB/s" is adjusted by throttling such that the performance is slightly higher than "600 MB/s" under worst-case conditions to consider margin during the stream recording. When operating at the performance of "450 MB/s", "300 MB/s", or "150 MB/s", the memory device 1 is adjusted such that the performance is slightly higher than a specified value by throttling.

In the case of "Gen3 2-lane" or "Gen4 1-lane", the maximum performance for stream recording may be selected from "1,200 MB/s", "1,050 MB/s", "900 MB/s", and "750 MB/s". For example, the memory device 1 manufactured with "1, 200 MB/s" selected can also support "1,050 MB/s", "900 MB/s", "750 MB/s", "600 MB/s", "450 MB/s", "300 MB/s", and "150 MB/s" lower than "1, 200 MB/s".

Similarly, in the case of "Gen4 2-lane", the maximum performance for stream recording may be selected from "2,400 MB/s", "2, 100 MB/s", "1, 800 MB/s", and "1, 500 MB/s". For example, the memory device 1 manufactured with "2, 400 MB/s" selected can support "2, 100 MB/s", "1, 800 MB/s", and "1, 500 MB/s" lower than "2, 400 MB/s", and "1,050 MB/s", "900 MB/s", "750 MB/s", "600 MB/s", "450 MB/s", "300 MB/s", and "150 MB/s" lower than "1, 200 MB/s".

As described above, the performance allocation for each interface configuration that can be applied by the memory device 1 is standardized, and the performance (class) to be provided to the host 2 for stream recording is also standardized, in the memory device 1 of the embodiment. For example, first, "150 MB/s", "300 MB/s", "450 MB/s", and "600 MB/s", which can be supported by "Gen3 1-lane" are standardized as four classes. In this case, the power states included in the power state set [2] 115 generated by the memory device 1 is four power states at maximum.

Since "Gen3 1-lane" is the PCIe bus mode having the lowest performance, the four classes can be used in other PCIe bus modes having higher performance. For example, the memory device 1 of "Gen4 2-lane", which can support "2, 400 MB/s" supports "150 MB/s", "300 MB/s", "450 MB/s", and "600 MB/s" up to "600 MB/s", for stream recording. However, even at the same speed class performance, the power consumption is higher as the PCIe bus interface has a higher speed.

Incidentally, if 4+N classes including N performance higher than "600 MB/s" are specified in the future, as extended standards for stream recording, "750 MB/s" higher than "600 MB/s" in FIG. 3, further higher "900 MB/s", and the like may be sequentially added. As a result, the manufacturer can manufacture, for example, the memory device 1 of "Gen3 2-lane" or "Gen4 1-lane" as a product focusing on support of the performance to be added by future expanded standards.

The NVMe™ controller 11 uses the power state set [1] 114 and the power state set [2] 115 separately by switching the contents to be stored in the power state register from the power state set [1] 114 to the power state set [2] 115, for example, based on receiving the NVMe™ command to request the stream recording operation from the host 2. In addition, the NVMe™ controller 11 may generate the power state set [2] 115 when receiving an NVMe™ command to instruct the stream recording from the host 2. In other words, the NVMe™ controller 11 may not generate the power state set [2] 115 unless the NVMe™ controller 11 receives the NVMe™ command to instruct the stream recording from the host 2. Alternatively, for example, if the memory device 1 is assumed to be used for the stream recording, the NVMe™ controller 11 may automatically perform generating the power state set [2] 115 and storing the contents of the power state set [2] 115 in the power state register. Furthermore, if the memory device 1 is assumed to be used for the stream recording, as described above, the NVMe™ controller 11 may not comprise the power state set [1] 114.

Incidentally, when the power consumption of the device is limited, the performance of the device that can be realized is also limited, as described above. If this value is small, the performance cannot be realized depending on the maximum allowable power (SPL value) of the host 2. Therefore, the performance that can be realized is determined by considering not only the interface configuration, but also the maximum allowable power. For example, five types of power values 1.8 W, 2.5 W, 2.8 W, 3.2 W, and 4.0 W are standardized to be assigned as threshold values of set values of the maximum allowable power. A finite number of combinations can be considered by using these five types of power values as boundary values.

In contrast, the memory device 1 can calculate the maximum implementable performance (class) for the combination of the interface configuration and the maximum allowable power in advance, by actual measurement or the like. FIG. 4 shows an example of an implementation of the memory device 1, based on results of the calculation of the maximum performance for the combination of the interface configuration and the maximum allowable power. When determining the interface configuration and the maximum allowable power, the NVMe™ controller 11 can determine the maximum class performance that can be used, by calculating the correspondence in the table shown in FIG. 4 during the design in advance.

FIG. 4(*a*) shows an example in which the memory device 1 can support the performance "600 MB/s" in a first example of "Gen3 1-lane", but the performance is degraded to "450 MB/s" with the allowable power consumption "1.8 W". When the maximum class performance that can be used is determined, the NVMe™ controller 11 can generate the power state set [2] 115 for stream recording.

In this case, when the initialization of the interface performed with the host 2 is completed, the interface configuration is determined to be "Gen3 1-lane". Then, when the SPL value obtained from the host 2 is "2.5 W" or higher, the maximum class performance is "600 MB/s", and the NVMe™ controller 11 generates the power state set [2] 115 including four power states, i.e., power state PS0="600 MB/s", power state PS1="450 MB/s", power state PS2="300 MB/s", and power state PS3="150 MB/s". When the SPL value is "1.8 W", the maximum class performance is "450 MB/s", and the NVMe™ controller 11 generates the power state set [2] 115 including three power states, i.e., power state PS0="450 MB/s", power state PS1="300 MB/s", and power state PS2="150 MB/s".

FIG. 4(*b*) shows an example in which the memory device 1 can realize the performance "300 MB/s" with all the allowable power consumption in a second example of "Gen3 1-lane".

In this case as well, when the initialization of the interface performed with the host 2 is completed, the interface configuration is determined to be "Gen3 1-lane". Then, even if the SPL value obtained from the host 2 is any value, the NVMe™ controller 11 generates the power state set [2] 115 including two power states, i.e., power state PS0="300 MB/s" and power state PS1="150 MB/s".

FIG. 4(c) shows an example in which the memory device 1 is "Gen4 1-lane". In this case, when the initialization of the interface performed with the host 2 is completed, the interface configuration is determined to be either "Gen3 1-lane" or "Gen4 1-lane" depending on the host 2. When the interface configuration is determined to "Gen3 1-lane", the memory device 1 can support the performance "600 MB/s", but the performance is degraded to "450 MB/s" with the allowable power consumption "1.8 W", similarly to the case shown in FIG. 4(a). The NVMe™ controller 11 generates the power state set [2] 115 including four power states, i.e., power state PS0="600 MB/s", power state PS1="450 MB/s", power state PS2="300 MB/s", and power state PS3="150 MB/s" when the SPL value obtained from the host 2 is "2.5 W" or higher, and generates the power state set [2] 115 including three power states, i.e., power state PS0="450 MB/s", power state PS1="300 MB/s", and power state PS2="150 MB/s" when the SPL value is "1.8 W".

In contrast, when the interface configuration is determined to be "Gen4 1-lane", the memory device 1 can realize the performance "1,050 MB/s" with the allowable power consumption of "3.2 W" or more and realize the performance "900 MB/s" with the allowable power consumption of "2.5 W" or more. Incidentally, the performance of "750 MB/s" can be realized with the allowable power consumption "1.8 W", but "Gen4" may not operate with the allowable power consumption "1.8 W" according to the SD Express™ specification of the SD™ standard. The performance "1,050 MB/s" can be realized by the device but, when it is assumed that, for example, the upper limit of the performance is determined to be "600 MB/s" in class performance standard version 1 of the SD Express™ specification of the SD™ standard, the NVMe™ controller 11 generates power state set [2] 115 including four power states, i.e., power state PS0="600 MB/s", power state PS1="450 MB/s", power state PS2="300 MB/s", and power state PS3="150 MB/s" even if the SPL value obtained by the host 2 is any value.

In addition, when the interface configuration is determined to be "Gen4 1-lane" and the SPL value is "2.5 W" or higher, on the assumption that, for example, "900 MB/s" and "750 MB/s" are added as extended standards for stream recording, the NVMe™ controller 11 generates the power state set [2] 115 including six power states, i.e., power state PS0="900 MB/s", power state PS1="750 MB/s", power state PS2="600 MB/s", power state PS3="450 MB/s", power state PS4="300 MB/s", and power state PS5="150 MB/s". When the SPL value is "1.8 W" or higher, the NVMe™ controller 11 generates the power state set [2] 115 including five power states, i.e., power states PS0="750 MB/s", power state PS1="600 MB/s", power state PS2="450 MB/s", power state PS3="300 MB/s", and power state PS4="150 MB/s". The above description indicates that the memory device can also operate by the device implementation when the SPL value is "1.8 W", but the host is required to set the SPL value higher than "1.8 W" when using "Gen4 1-lane".

FIG. 4(d) shows an example in which the memory device 1 is "Gen3 2-lane". In this case, when the initialization of the interface performed with the host 2 is completed, the interface configuration is determined to be either "Gen3 1-lane" or "Gen3 2-lane" depending on the host 2. When the interface configuration is determined to "Gen3 1-lane", the memory device 1 can realize the performance "450 MB/s" with all the allowable power consumption. Even if the SPL value obtained from the host 2 is any value, the NVMe™ controller 11 generates the power state set [2] 115 including three power states, i.e., power state PS0="450 MB/s", power state PS1="300 MB/s", and power state PS2="150 MB/s".

In contrast, when the interface configuration is determined to "Gen4 2-lane", the memory device 1 can realize the performance "900 MB/s" with the allowable power consumption of "2.5 W" or more. When it is assumed that, for example, the upper limit of the performance is determined to be "600 MB/s" in the SD Express™ specification of the SD™ standard, the NVMe™ controller 11 generates power state set [2] 115 including four power states, i.e., power state PS0="600 MB/s", power state PS1="450 MB/s", power state PS2="300 MB/s", and power state PS3="150 MB/s" if the SPL value obtained by the host 2 is "2.5 W" or more. When the interface configuration is determined to be "Gen3 2-lane" and the SPL value is "1.8 W", then stream recording is not supported. The host can recognize that the device cannot be supported for the reason that a valid power state is absent. When using "Gen3 2-lane", the host is required to set the SPL value greater than "1.8 W".

In addition, when the interface configuration is determined to be "Gene3 2-lane" and the SPL value is "2.5 W" or higher, and when the host corresponds to the class performance standard version 2, on the assumption that, for example, "900 MB/s" and "750 MB/s" are added as the extended standard for stream recording, for example, class performance standard version 2 of the SD Express™ specification in the SD™ standard, the NVMe™ controller 11 generates the power state set [2] 115 including six power states, i.e., power state PS0="900 MB/s", power state PS1="750 MB/s", power state PS2="600 MB/s", power state PS3="450 MB/s", power state PS4="300 MB/s", and power state PS5="150 MB/s". When the host corresponds to the only class performance standard version 1, the NVMe™ controller 11 generates the power state set [2] 115 including four power states, i.e., power state PS0="600 MB/s", power state PS1="450 MB/s", power state PS2="300 MB/s", and power state PS3="150 MB/s".

FIG. 4(e) shows an example in which the memory device 1 is "Gen4 2-lane". In this case, when the initialization of the interface performed with the host 2 is completed, the interface configuration is determined to be one of "Gen3 1-lane", "Gen3 2-lane", "Gen4 1-lane", and "Gen4 2-lane", depending on the host 2. In addition, the memory device 1 can also select one of "Gen3 1-lane", "Gen3 2-lane", "Gen4 1-lane", and "Gen4 2-lane", for example, depending on the SPL value. In other words, a bus mode in which the host and memory device can operate in common and which is faster is selected. When the interface configuration is determined to "Gen3 1-lane", the memory device 1 can realize the performance "450 MB/s" with all the allowable power consumption. Even if the SPL value obtained from the host 2 is any value, the NVMe™ controller 11 generates the power state set [2] 115 including three power states, i.e., power state PS0="450 MB/s", power state PS1="300 MB/s", and power state PS2="150 MB/s".

When the interface configuration is determined to "Gen3 2-lane" or "Gen4 1-lane", the memory device 1 can realize the performance "900 MB/s" with the allowable power consumption of "2.5 W" or more. When it is assumed that, for example, the upper limit of the performance is determined to be "600 MB/s" in class performance standard version 1 of the SD Express™ specification of the SD™ standard, the NVMe™ controller 11 generates power state set [2] 115 including four power states, i.e., power state PS0="600 MB/s", power state PS1="450 MB/s", power state PS2="300 MB/s", and power state PS3="150 MB/s" if the SPL value obtained by the host 2 is "2.5 W" or more. When the interface configuration is determined to be "Gen3 2-lane" or "Gen4 1-lane" and the SPL value is "1.8 W", then stream recording is not supported.

When the interface configuration is determined to be "Gen4 2-lane", the memory device 1 can realize the performance "1, 800 MB/s" with the allowable power consumption of "4.0 W" or more and realize the performance "1, 500 MB/s" with the allowable power consumption of "3.2 W" or more, but cannot support the stream recording when the SPL value is less than "3.2 W". The host can reduce the power consumption by using "Gen3 1-lane", "Gen3 2-lane" or "Gen4 1-lane", and the possibility that the memory device 1 can operate may increase. For example, when the interface is initialized with "Gen3 2-lane", the NVMe™ controller 11 can operate at "900 MB/s" if the SPL value obtained from the host 2 is "2.5 W" or more. When it is assumed that, for example, the upper limit of the performance is determined to be "600 MB/s" in class performance standard version 1 of the SD Express™ specification of the SD™ standard, the NVMe™ controller 11 generates power state set [2] 115 including four power states, i.e., power state PS0="600 MB/s", power state PS1="450 MB/s", power state PS2="300 MB/s", and power state PS3="150 MB/s". In other words, "Gen4 2-lane" is the bus mode which needs to be used when the performance exceeding "1, 200 MB/s" is required in the future. The host which corresponds to the only class performance standard version 1 desirably does not support "Gen4 2-lane".

In addition, when the interface configuration is determined to be "Gen3 2-lane" or "Gen4 1-lane" and the SPL value is "2.5 W" or higher or when the interface configuration is determined to be "Gen4 2-lane" and the SPL value is "3.2 W" or higher for the class performance standard version 2 host, on the assumption that, for example, "900 MB/s" and "750 MB/s" are added to the class performance standard version 2 as extended standards for stream recording, the NVMe™ controller 11 generates the power state set [2] 115 including six power states, i.e., power state PS0="900 MB/s", power state PS1="750 MB/s", power state PS2="600 MB/s", power state PS3="450 MB/s", power state PS4="300 MB/s", and power state PS5="150 MB/s".

FIG. 5 is a table showing an example of the configuration of the power state set [2] 115. For example, when it is assumed that the upper limit of the performance is determined to be "600 MB/s" in the class performance standard version 1 of the SD Express™ specification of the SD™ standard, these power states are valid power states. The table indicates that if no power states are set or power state settings are invalid (for example, all states are set to zero), the device cannot support the class performance due to the interface configuration or allowable power consumption limitations.

If the memory device 1 can support the performance "150 MB/s" for stream recording, the power state set [2] 115 including one power state, i.e., power state PS0="150 MB/s" is generated. As described above, the performance which the memory device 1 can support for stream recording varies depending on the host 2.

If the memory device 1 can support the performance "300 MB/s", the power state set [2] 115 including two power states, i.e., power state PS0="300 MB/s" and power state PS1="150 MB/s" is generated. In addition, if the memory device 1 can support the performance "450 MB/s", the power state set [2] 115 including three power states, i.e., power state PS0="450 MB/s", power state PS1="300 MB/s", and power state PS2="150 MB/s" is generated. Then, when the memory device 1 can support the performance "600 MB/s", the NVMe™ controller 11 generates the power state set [2] 115 including four power states, i.e., power state PS0="600 MB/s", power state PS1="450 MB/s", power state PS2="300 MB/s", and power state PS3="150 MB/s".

Thus, in the power state set [1] 115 for stream recording included in the memory device 1 of the embodiment, in addition to the power state set [1] 114 for default, the number of power states varies depending on the combination of the memory device 1 and the host 2 while the number of power states in the power state set [1] 114 is fixed.

As described above, the host 2 can read the power state register of the memory device 1 with the NVMe™ command. The number of power states is stored in the power state register. The host 2 can recognize the maximum performance supported by the memory device 1 for stream recording, by referring to this number of power states.

For example, if the number of power states is three, the host 2 can recognize power state PS0="450 MB/s", power state PS1="300 MB/s", and power state PS2="150 MB/s". As a result, for example, the host 2 can select power state PS0 for recording in high quality where "450 MB/s" is required, select power state PS1 for recording in medium quality where "300 MB/s" is sufficient, and select power state PS2 for low quality recording where "150 MB/s" is sufficient.

FIG. 6 is a table showing an example of the configuration of the power state set [2] 115 in a case where "750 MB/s" and "900 MB/s" are added as extended standards for stream recording.

FIG. 6 can be interpreted as another example. PS0 and PS1 belong to the power state set [1] for non-stream recording, and PS2, PS3, PS4 and PS5 belong to the power state set [2] for stream recording.

For example, even if the memory device 1 can support the performance "900 MB/s" for stream recording, the maximum performance for stream recording supported by the memory device 1 is "600 MB/s", and this is assigned to power state PS0, and then "450 MB/s", "300 MB/s", and "150 MB/s" are assigned to power state PS1, power state PS2, and power state PS3, respectively, under the above-described standardization. In contrast, when the extended standards are specified, the device needs to change the manner of generating the power states, depending on the version information of the host. FIG. 7 shows an example of determining the maximum performance based on the combination of the host version and the device version in a case where the classes shown in FIG. 3 are specified and the standards are extended. As shown in FIG. 7, class performance standard version 1 is extended to the maximum performance "600 MB/s", class performance standard version 2 is extended to the maximum performance "1, 200 MB/s", and class performance standard version 3 is extended to the maximum performance "2,400 MB/s".

The maximum class performance set for PS0 by the version 2 device and the version 3 device needs to be determined by considering the host version. The host version does not need to be considered for the version 1 device.

If the version 1 host is connected to the version 2 device with the maximum performance "900 MB/s", the maximum performance remains at "600 MB/s". If the version 2 host is connected, the maximum performance "900 MB/s" is assigned to power state PS0, and then "750 MB/s", "600 MB/s", "450 MB/s", "300 MB/s", and "150 MB/s" are assigned to power state PS1, power state PS2, power state PS3, power state PS4, and power state PS5, respectively, as shown in FIG. 7.

The SPL register value can be used as one of methods for recognizing the class performance standard version of the host. In the SD Express™ specification of the SD™ standard, 1.8 W, 2.5 W, 2.8 W, 3.2 W, and 4.0 W are defined as SPL boundary values, and 2.8 W or more is set for Gen3× 2/Gen4×1, and 4.0 W or more is set for Gen4×2. The power states for the defined powers are included in the power state set [1]. However, since this power limit value assumes that the device is operated at full power without throttling, a large power value is required. In contrast, since the speed class assumes an environment in which long-time stream recording can be performed stably by lowering the power consumption and reducing the heat generation, the speed class can be implemented with a lower SPL set value. For example, even if the SPL value is less than 2.8 W, it is possible to implement Gen3×2/Gen4×1 operation. In other words, the conventional SPL specified value is not a requirement for the speed class. Since the performance and the power consumption are considered to be correlated with each other, the class performance standard version supported by the host can be associated with the SPL value set by the host. For example, when the SPL is set to less than 2.8 W, the memory device 1 recognize the class performance standard of the host as version 1. Gen4×2 is less likely to be implemented due to lack of power. Implementation of 600 MB/s can be sufficiently performed with Gen3×2/Gen4×1, and implementation of 600 MB/s can be performed even with Gen3×1. Furthermore, for example, when the SPL is set be 2.8 W or more and less than 4.0 W, the class performance standard of the host is recognized as version 2. When the SPL is set to 4.0 W or more, the class performance standard of the host is recognized as version 3. If the memory device 1 is in the class performance standard version 1, the host's class performance standard version does not need to be reviewed. 2.8 W and 4.0 W are examples of the power boundary values, and the other power values may be set as the boundary values as long as the three versions can be distinguished. For example, 2.5 W and 3.2 W may be used as the boundary values.

Thus, the memory device 1 of the embodiment enables the stream recording, which has been difficult to perform stably over a long period of time due to high flexibility of PCIe™ and NVMe™, by standardizing the performance related to the stream recording and dynamically configuring the power state set [2] 115 for stream recording according to the host 2 under this standard. The host 2 which performs stream recording to the memory device 1 only needs to select one power state which meets the purpose such as image quality from among one or more power states in the power state register obtained from the memory device 1.

Figure 8:
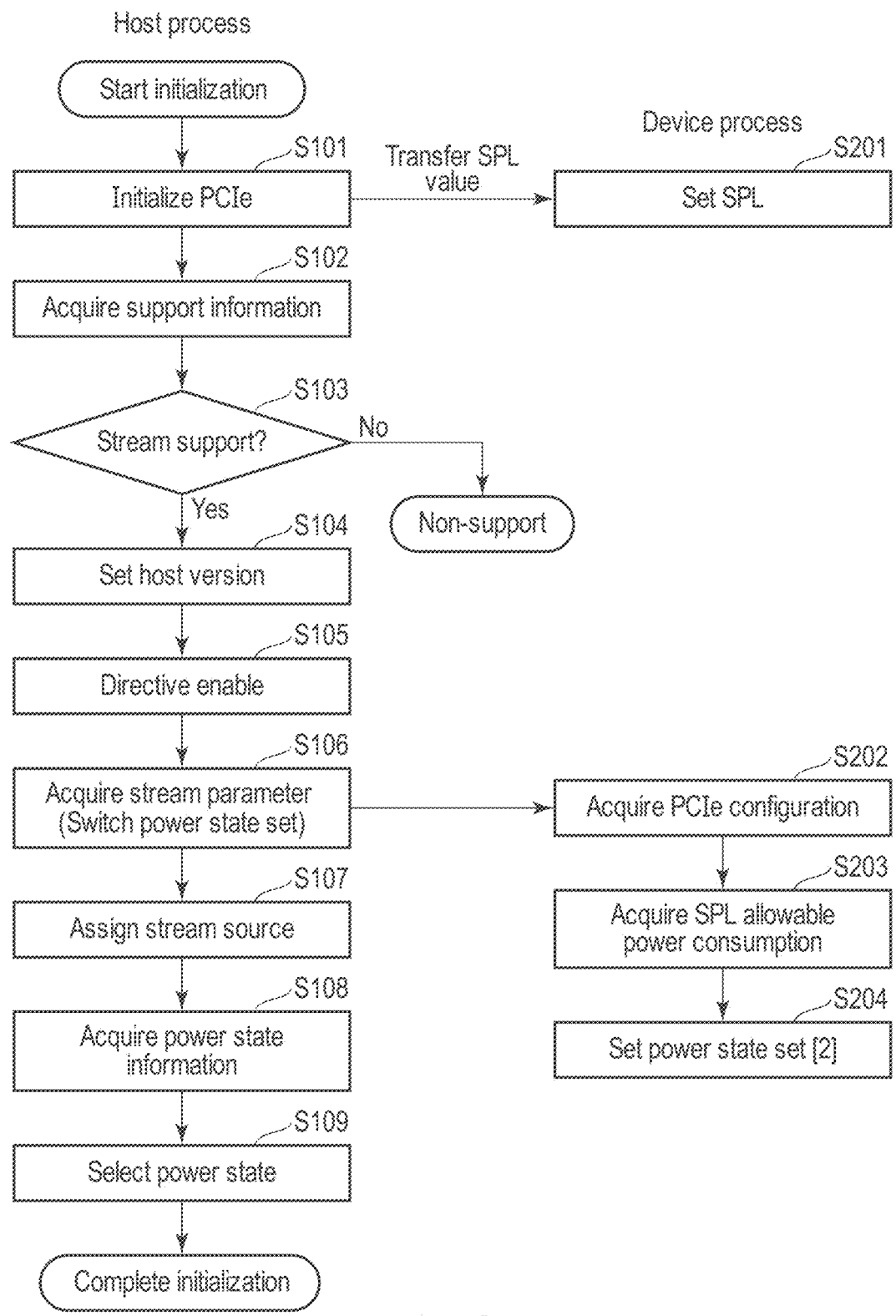
FIG. 8 is a flowchart showing a flow of interface initialization executed cooperatively by the memory device and the host of the embodiment.

FIG. 8 is a flowchart showing a flow of interface initialization executed cooperatively by the host 2 and the memory device 1.

The system controller 22 of the host 2 transfers the SPL value stored in the SPL register 250 of the PCIe™ port 222 to the memory device 1, using Set_Slot_Power_Limit Message, during the initialization of the interface specified by the PCIe™ standard between the host 2 and the memory device 1 (S101). The NVMe™ controller 11 of the memory device 1 stores the SPL value received from the host 2, in the SPL register 150 of the interface circuit 111 (S201). As described above, the memory device 1 can use the class performance standard version which the host supports with the SPL value, for identification.

Next, the processor 21 of the host 2 acquires the support information from the memory device 1 via the system controller 22 of the host 2 (S102). This support information includes information indicating whether or not the memory device 1 supports the stream recording. The processor 21 of the host 2 determines whether or not the memory device 1 supports the stream recording via the system controller 22 of the host 2, based on the acquired support information (S103). If the stream recording is not supported (S103: No), the system controller 22 of the host 2 does not perform any subsequent initialization process for stream recording, ends the interface initialization, and operates as a normal memory device.

In contrast, if the stream recording is supported (S103: Yes), the host sets the host version of the SD Express class performance, in the device (S104). For example, the host version is transferred using the NVMe™ command. This step can be omitted if the class performance standard version which the host supports with the SPL value is used for identification as described above.

The processor 21 of the host 2 enables the stream directive to be used with the Directive command, which is an NVMe™ command via the system controller 22 of the host 2 (S105). The stream directive is a group of commands (stream directive commands) used for the stream recording, such as the Directive Receive command and Directive Send command.

When the stream directive is enabled, the processor 21 of the host 2 acquires a parameter necessary for the stream recording (i.e., stream-related parameter) via the system controller 22 of the host 2 from the memory device 1 (S106). The NVMe™ controller 11 of the memory device 1 transmits the stream-related parameter to the host 2 in response to the request from the host 2 (not shown). For example, the number of available streams, the data size of the stream write command (above-described SWS), the management size of the stream region (above-described SGS), and the like can be obtained. In addition, after that, the NVMe™ controller 11 of the memory device 1 acquires the PCIe™ bus configuration information from the PCIe™ register (S202).

Furthermore, the NVMe™ controller 11 of the memory device 1 acquires the allowable power consumption from the SPL register 150 of the interface circuit 111 (S203). The NVMe™ controller 11 of memory device 1 acquires the SPL set value or the host version set in (S104). The NVMe™ controller 11 of the memory device 1 sets the power state set [2] 115, based on the PCIe™ bus configuration information, the allowable power consumption, and the host version (S204).

The processor 21 of the host 2 allocates resources for stream recording to the NVMe™ controller 11 via the system controller 22 of the host 2 (S107) and determines, for example, the number of multi-streams to be used, and the NVMe™ controller 11 can thereby secure buffer resources in which data for streaming are temporarily stored, and the like. In addition, the processor 21 of the host 2 acquires the power state information (contents of the power state register) from the memory device 1 (S108). Then, the processor 21 of the host 2 selects the power state suitable for the image quality via the system controller 22 of the host 2, and the like from the acquired power state information (S109). When receiving the NVMe™ command to acquire the power state information in S108, the NVMe™ controller 11 returns the power state information to the host 2 after setting the power state set [2] 115 in S104 has been completed.

As described above, the memory device 1 of the embodiment can generate the power state which enables stream recording to be performed stably for a long time according to the result of the connection with the host.

Incidentally, if the power state set [2] 115 for stream recording is generated in the memory device 1 based on various information acquired by the interface initialization that is cooperatively executed by the host 2 and the memory device 1 and if the host 2 selects one of the power states to perform the stream recording, the temperature is theoretically considered not to rise above a certain level in the memory device 1.

However, since the relationship between the power consumption and the heat dissipation capability is complex, it is not easy to implement the heat dissipation capability which can be theoretically calculated. For example, as described above, the heat dissipation mechanism 25 theoretically has the ability to dissipate heat generated in the memory device 1 when the maximum allowable power indicated by the SPL value is supplied from the power supply circuit 24. Since the air layer in the gap between the heat dissipation mechanism 25 arranged on the host 2 side and the memory device 1 has low thermal conductivity, the air layer may cause the temperature of the memory device 1 to rise. The thermal conductivity varies depending on the material of the memory device 1, the surface temperature of the memory device 1 is not uniform, and the location of heat generation varies depending on the mounting positions of the heat generating components, and there are a number of other factors that affect temperature depending on mounting.

In consideration of this point, the memory device 1 of the embodiment monitors the temperature in the memory device 1 and notifies the host 2 of an event if the temperature exceeds a threshold value during the stream recording. In contrast, when selecting the power state using an event notification function of the memory device 1, the host 2 verifies whether or not it is actually possible to stably perform the stream recording for a long period in the selected power state. Incidentally, the memory device 1 comprises the temperature sensor 113 in the NVMe™ controller 11 and the temperature sensor 123 in the flash memory 12. Since the flash memory 12 has an upper temperature limit for operation lower than the NVMe™ controller 11, the detected temperature of the temperature sensor 123 is desirably used in this monitoring.

More specifically, the host 2 performs continuous writing data such as test data to the memory device 1 or continuous reading of the data from the memory device 1. The performance in real-time stream recording is noticed at a write time, but can be measured by a read operation with large power consumption. The "SGS for measurement" of the flash memory 12 in FIG. 1 is a region used as a write destination for test data and the like. The memory device 1 can utilize, for example, a defective block or the like, which cannot be used to store data, as this region. When the defective block is used, an error can be detected but may be ignored. By securing such a region in advance for continuous writing of test data, it is possible to prevent the user region 122 from being used for test. In addition, when the user region 122 is used, the host 2 can perform writing the test data. When the defective block is used, the memory device 1 needs to perform writing since the defective block cannot be accessed from the outside. For example, a predetermined defective block address is set in advance in the NVMe™ controller 11. By detecting the occurrence of an event beyond the temperature threshold value, the NVMe™ controller 11 selects an incremented number of power state and performs specified continuous data write to a preset region of the flash memory 12 as described above.

If there is no event notification from the memory device 1 within a specified time after starting this continuous write, the host 2 determines that the stream recording can be performed stably for a long period, and completes setting the power state for stream recording.

When the host 2 performs continuous write of the test data to the memory device 1 for a specified time before starting the stream recording, the host 2 also has an advantage that the stream recording can be started after the temperature rise of the memory device 1 has stopped and the device becomes in a steady state.

In contrast, when receiving the event notification within a specified time, the host 2 performs change to a power state with performance lower by one level than the current power state and performs the continuous write of the test data again. As a result, if there is no event notification within a specified time, the host 2 determines that the stream recording can be stably performed for a long period in the changed power state, and completes setting the power state for stream recording. If the host 2 performs the continuous write of the test data after changing the power state with the lowest performance and receives an event notification within a specified time, the host 2 determines that the memory device 1 cannot be used for the stream recording. Incidentally, in the "training result" of the flash memory 12 in the figure, information indicating whether or not a temperature rise above the threshold value has occurred at the continuous write of the test data is recorded as history information.

In addition, another method is to perform power state selection during actual stream recording without using the test access. If no event occurs, the default power state can continue to be used. When receiving an event notification, the host 2 performs change to a power state with performance lower by one level than the current power state. The host 2 continues using the selected power state if no event occurs or further performs change to a power state with performance lower by one level when receiving the event notification. When change to a power state with lower performance cannot be performed, the host 2 determines that the memory device 1 cannot be used for stream recording. Alternatively, when receiving the event notification, the host may reduce the write frequency by lowering the image quality (bit rate, resolution, amount of color information, and the like) to adjust the temperature, instead of changing to a power state with performance lower by one level.

Thus, the memory device 1 of the embodiment cooperates with the host 2 to realize stream recording, stably and more reliably, over a long period of time.

Figure 9:
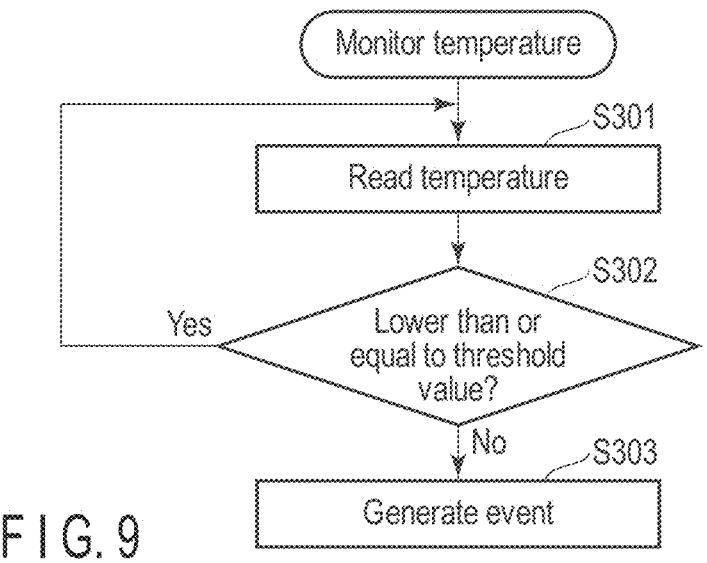
FIG. 9 is a flowchart showing a flow of temperature monitoring executed by the memory device of the embodiment.

FIG. 9 is a flowchart showing a flow of temperature monitoring executed by the memory device 1.

The NVMe™ controller 11 of the memory device 1 reads the temperature detected by the temperature sensor 123 of the flash memory 12 at a certain time interval (S301). The NVMe™ controller 11 determines whether or not the read temperature is lower than or equal to a threshold value (S302). If the temperature exceeds the threshold value (S302: No), the NVMe™ controller 11 generates an event to inform the host 2 that the temperature has risen above a certain level (S303).

Figure 10:
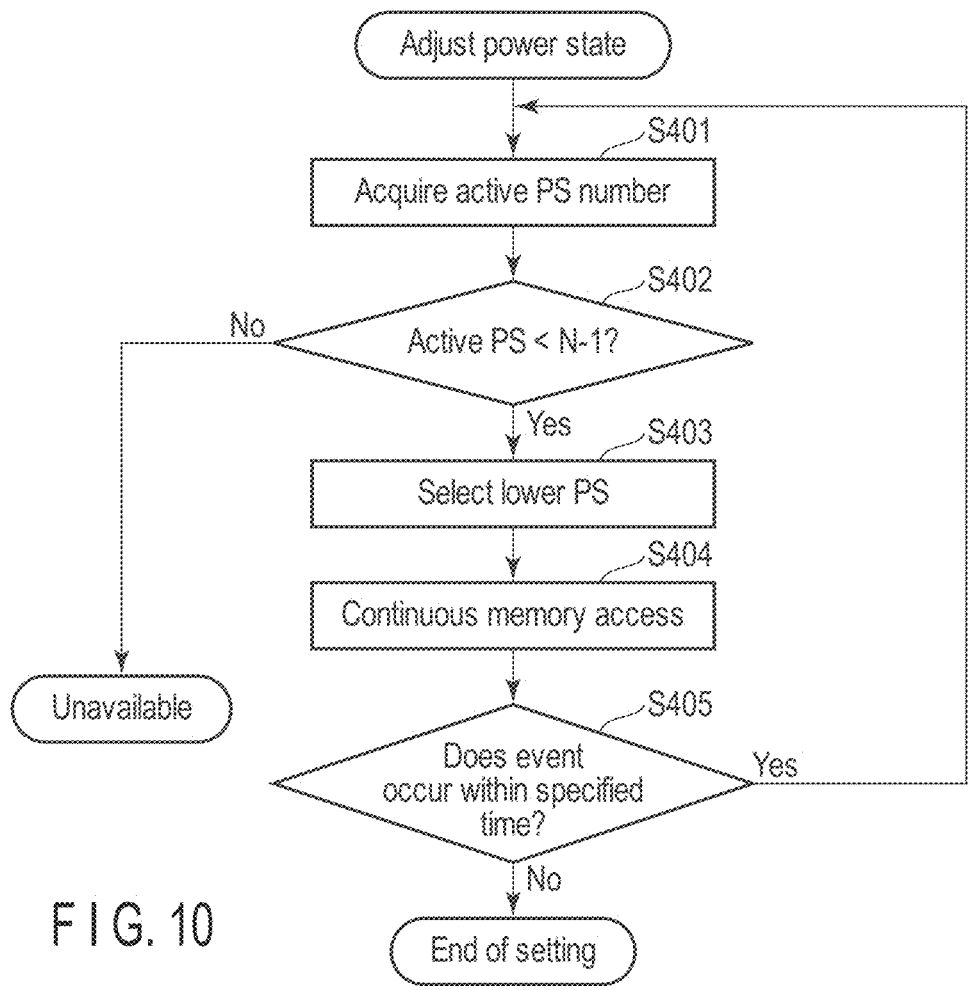
FIG. 10 is a flowchart showing a flow of power state adjustment executed by the host of the embodiment.

FIG. 10 is a flowchart showing a flow of power state adjustment executed by the host 2 or the NVMe™ controller 11. In FIG. 10, N−1 indicates the number of the power state with the lowest performance. The number of the power state with the highest performance is 0.

The case where the host 2 executes this function will be described. When receiving an event notification from the memory device 1, the processor 21 of the host 2 first acquires the number of the current power state via the system controller 22 of the host 2 (S401). If the acquired power state number matches number N−1 of the power state with the lowest performance (S402: No), the processor 21 determines that the memory device 1 is unavailable for the stream recording via the system controller 22. The flowchart has the condition of lowering the number of the power state with the lowest performance. Since the power state number is incremented, the flow shifts to "S402: No" when the acquired power state number matches the power state number N−1.

If the acquired power state number is smaller than the number of the power state with the lowest performance (S402: Yes), the processor 21 selects a power state with performance lower by one level than the current power state via the system controller 22 (S403) and performs continuous access to the memory device 1 via the system controller 22 (S404). However, step S404 can be omitted, and instead the temperature monitoring can be performed while performing actual stream recording. The NVMe™ controller 11 continues performing the temperature monitoring shown in FIG. 9.

The processor 21 determines whether or not an event has occurred within a specified time via the system controller 22 (S405) and, if an event has occurred within a specified time (S405: Yes), returns to S401 and repeats the process from S401. In contrast, if no event occurs within a specified time (S405: No), the processor 21 determines that the stream recording can be performed stably in the current power state for a long period and ends the power state adjustment via the system controller 22. If step S404 is omitted, the power state adjustment is ended immediately.

As described above, in the memory device 1 of the embodiment, the host 2 and the memory device 1 cooperatively execute training, and stably performing the stream recording for a long time is thereby implemented certainly.

In the above description, the example in which the host 2 performs continuous data write to the memory device 1 for training has been described, but the memory device 1 may perform the continuous data write by the background process of the memory device 1, regardless of commands from the host. If a temperature rise above the threshold value occurs as a result of the continuous data write, the memory device 1 may make the event notification to the host 2 and, upon receiving this event notification, the host 2 may instruct the memory device 1 to change the power states. In addition, training may also be performed with continuous memory write performed during the actual stream recording. As described above, the host may adjust the temperature by reducing the write frequency by lowering the image quality (bit rate, resolution, amount of color information, and the like), instead of changing to the power state with lower performance.

Alternatively, the memory device 1 may internally perform changing the power state when a temperature rise above the threshold value occurs and, when detecting the power state in which the temperature rise above the threshold value does not occur, may notify the host 2 of this power state. When receiving this notification, the host 2 may instruct the memory device 1 to perform or not to perform the stream recording in this power state.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory card comprising:
a nonvolatile memory; and
a controller connectable to a host via an interface conforming to PCI Express™ (PCIe™) standard, capable of performing communication for data write or data read via a protocol conforming to NVM Express™ (NVMe™) standard, with the host, and configured to control the nonvolatile memory, wherein
the controller is configured to
perform initialization of the interface cooperatively with the host,
determine a maximum performance capable of being supported from among a plurality of performance specified in advance for stream recording, based on a bus configuration of the interface determined at the interface initialization and a maximum allowable power consumption set during the interface initialization, and
configure the power state register specified by the NVMe™ standard with plurality of power states with descending order of power consumption and also descending order of performance, and
the plurality of power states includes power states for stream recording that are correspondence to a list of specific performance for stream recording.

2. The memory card of claim 1, wherein
a bus configuration of the interface is determined by a bus speed and the number of lanes determined by a procedure of the initialization specified by the PCIe™ standard.

3. The memory card of claim 1, wherein
the controller is configured to acquire the maximum allowable power consumption from a value of Slot Power Limit register transferred from the host by a Slot_Power_Limit message specified by the PCIe™ standard.

4. The memory card of claim 1, wherein:
when a maximum allowable power consumption value is determined by associating performance which a host is capable of supporting and maximum performance which the memory system is capable of supporting with each of a plurality of ranges of the maximum allowable power consumption, the performance which the host is capable of supporting and the maximum performance which the memory system is capable of supporting are determined, and
the controller is configured to generate the power state set by using a lower one of the performance which the host is capable of supporting and the maximum performance which the memory system is capable of supporting, as a maximum performance of the power state.

5. The memory card of claim 1, wherein
the controller is configured with the power states register which includes a first power state set for non-stream recording without performance values and a second power state set for stream recording which are defined by specific performance values.

6. The memory card of claim 1, further comprising a temperature sensor, wherein
the controller is configured to
perform continuous data write to or data read from the nonvolatile memory for a certain period in response to a request from the host or voluntarily, after receiving a command to request an operation of the stream recording,
monitor a temperature detected by the temperature sensor while performing continuous data write to the nonvolatile memory, and
notify the host of temperature rise above a certain level, of the memory system when the temperature exceeds a threshold value.

7. The memory card of claim 6, wherein
when voluntarily performing continuous data write to or data read from the nonvolatile memory, in a case where the temperature exceeds a threshold value within the certain period, the controller is configured to
perform changing to a power state of performance lower than a current power state, and
select a power state in which the temperature does not exceed the threshold value by even performing continuous data write to or data read from the nonvolatile memory.

8. The memory card of claim 6, wherein
the controller is configured to perform the continuous data write in a region of the nonvolatile memory, which is secured in advance for the continuous data write.

9. A memory card comprising:
a nonvolatile memory; and
a controller configured to control the nonvolatile memory, connectable to a host via an interface conforming to PCI Express™ (PCIe™) standard, and capable of performing communication for data write or data read via a protocol conforming to the NVM Express™ (NVMe™) standard, with the host, wherein
the controller is configured to
perform interface initialization conforming to the PCIe™ cooperatively with the host,
determine maximum performance that is capable of being supported, among a plurality of performance specified in advance for stream recording, based on a bus configuration of the interface determined by the interface initialization and a maximum allowable power consumption set in the interface initialization, and
the controller further comprises a first register and a second register, the first register being a register in which a power state for stream recording specified by the NVMe™ standard and generated for each performance lower than or equal to the maximum performance capable of being supported is stored, the second register being a register in which information for generating the power state for stream recording is stored.

10. The memory card of claim 9, wherein
a power state for stream recording to be used is selected from the power states by the host, and the selected power state for stream recording is set to the controller.

11. The memory card of claim 9, wherein
power state performance is specified from the information for generating the power state for stream recording read from the second register, the power state used for stream recording is selected from power state information read from the first register by the host, and the selected power state for stream recording is set in the controller.

12. The memory card of claim 10, wherein
the controller is configured to perform stream recording to the nonvolatile memory, based on the selected power state for stream recording.

13. The memory card of claim 11, wherein
the controller is configured to perform stream recording to the nonvolatile memory, based on the selected power state for stream recording.

14. The memory card of claim 9, wherein
the controller is capable of corresponding to SD Express performance.

15. The memory card of claim 9, wherein
the controller is configured to
monitor temperature information inside the memory system, and,
if the temperature information exceeds a threshold value, change the power state for stream recording to a power state with low power consumption and notifies the host of an event.

16. The memory card of claim 9, wherein
the controller is configured to
acquire the maximum allowable power consumption from performance of a PCIe bus mode selected by initialization of a PCIe™ interface between a host and a memory card and from a Slot Power Limit register value transferred from the host by a Slot_Power_Limit message specified by the PCIe™ standard, as the bus configuration, and
determine the maximum performance capable of being supported by the memory card.

17. A host device comprising:
a controller connectable to a memory system via an interface conforming to PCI Express™ (PCIe™) standard, and capable of performing communication for data write or data read via a protocol conforming to the NVM Express™ (NVMe™) standard, with the memory system; and
a power supply circuit capable of supplying power to the memory system, wherein
the system controller is configured to
perform the interface initialization cooperatively with the memory system,
notify the memory system of a maximum allowable power consumption of the memory system which the power supply circuit is capable of supplying, during the interface initialization, and
when performing stream recording using the memory system,
transmit a command which is specified by the NVMe™ standard and which requests an operation of stream recording to the memory system,
acquire a content of a power state register specified by the NVMe™ standard from the memory system, and
select one power state from among one or more power states stored in the power state register and set the power state in the memory system.

18. The host device of claim 17, wherein
before starting the stream recording, the system controller is configured to
perform continuous data write to the memory system for a certain period, and,
if notified of temperature rise above a certain level of the memory system by the memory system within the certain period, reselect a power state with performance lower than a current power state from among one or more power states stored in the power
state register and set the power state in the memory
system.
19. The host device of claim 18, wherein
the system controller is configured to specify an address
fixed in advance, and perform continuous data write to
the memory system.

\* \* \* \* \*